United States Patent [19]
Ragard
[11] 3,852,865
[45] Dec. 10, 1974

[54] SEMI AUTOMATIC ELECTRONIC COMPONENT ASSEMBLER

[75] Inventor: Phillip A. Ragard, Binghamton, N.Y.
[73] Assignee: Universal Instruments Corporation, Binghampton, N.Y.

[22] Filed: Oct. 30, 1973
[21] Appl. No.: 411,029

[52] U.S. Cl. .............................................. 29/203 B
[51] Int. Cl. ............................................. H01r 43/04
[58] Field of Search .......... 29/203 B, 203 R, 203 D; 227/2, 90, 136

[56] References Cited
UNITED STATES PATENTS

| | | | |
|---|---|---|---|
| 3,539,086 | 11/1970 | Ragard et al. | 227/2 |
| 3,545,064 | 12/1970 | Zemek et al. | 29/203 B |
| 3,636,624 | 1/1972 | Bates | 29/203 B |

*Primary Examiner*—Thomas H. Eager
*Attorney, Agent, or Firm*—Fidelman, Wolffe, Leitner & Hiney

[57] ABSTRACT

A semi-automatic assembler for manually inserted electronic components having a control for positioning the workpiece, identifying the component to be used from a plurality of component bins, indicating the location on the workpiece where the component is to be inserted and its proper orientation, and positioning the cut and clinch assembly by rotation for the component orientation. After the manual insertion of the component into the workpiece, a control is activated to automatically cut and clinch the component lead ends.

22 Claims, 18 Drawing Figures

SEMI AUTOMATIC ELECTRONIC COMPONENT ASSEMBLER

BACKGROUND OF THE INVENTION

1. Field of the Invention

The present invention relates generally to an electronic component assembly machine. More specifically, it relates to a semi-automatic assembly machine wherein components are manually inserted, manually secured to the workpiece, and automatically cut and clinched.

2. Description of the Prior Art

In the field of electronic component assembly machines, there are a multitude of fully automatic electronic component assembly machines. These machines generally select an electronic component from a plurality of supplies or use a pre-sequenced taped supply and automatically insert the electrical components into a workpiece. The electronic components are then automatically cut and clinched to complete the assembly operation.

A typical example of a variable sized modular sequence and inserting apparatus is disclosed in Pat. No. 3,545,064. A multisized variable center electronic component insertion machine is disclosed in Pat. No. 3,539,086, which includes cutting and clinching of the leads. A transistor inserting apparatus is disclosed in Pat. No. 3,636,624.

The above patents are samples of the prior art which generally disclose automatic insertion heads for inserting a variety of components. In spite of the multitude of prior art devices which insert a variety of components, a need still exists for a machine which will aid in the assembly of a circuit board requiring manual insertion of components having odd sizes and shapes. In industry, printed circuit boards will generally go through one of the above-mentioned apparatus for insertion of regular sized components, such as resistors, transistors, etc. These boards can only be partially completed by automatic apparatus, and requiring the manual insertion of odd-sized components.

To meet this need, devices have been developed which display the location of hand insertable components. These programmed devices are fairly complicated and expensive. Also, these decives do not provide an automatic cut and clinch subassembly; instead they require the removal of the board and hand cutting and clinching.

A machine to aid in assembling manually inserted, automatically cut and clinched electrical components whose axial leads are bent or L-shaped for insertion is disclosed in application Ser. No. 411,044, filed Oct. 30, 1973, to Phillip Ragard, titled "Electronic Component Semi-Automatic Assembly Machine."

SUMMARY OF THE INVENTION

The present invention is a manual assembly machine for electronic components having a mini-computer control for positioning the printed circuit board, identifying the component to be used from a plurality of component bins, indicating the location on the circuit board where the component is to be inserted and its proper orientation, and positioning the cut and clinch assembly by rotation for the component orientation. After the manual insertion of the component into the workpiece, a control is activated to automatically cut and clinch the component lead ends while the operator holds the component fixed to the workpiece.

OBJECTS OF THE INVENTION

It is an object of the present invention to provide a semi-automatic machine which will cut and clinch components which are manually inserted and manually held against the workpiece.

Another object of the invention is to provide a stationary projection system with a work table movable in an X–Y direction to position the workpiece relative to the projection system and a rotatable cut and clinch.

A further object of the present invention is to provide an automatic system which positions the workpiece, indicates the location and orientation of the component to be inserted, indicates the source from which the component is to be selected and automatically cuts and clinches the inserted electronic component.

Still another object is to provide a system which positions the workpiece in two orthogonal directions, indicates the position and orientation of the component to be manually inserted, and rotatably adjusts the automatic cut and clinch mechanism for different component orientations.

Other objects, advantages and novel features of the present invention will become apparent from the following detailed description of the invention when considered in conjunction with the accompanying drawings.

DESCRIPTION OF THE PREFERRED EMBODIMENTS

Electrical components may be generally grouped (for the purposes of the present description) into axial lead components and non-axial lead components. The axial lead components, which is represented by a resistor 30 in FIG. 1, has a body 32 and two leads 34 and 36 extending axially thereform in opposite directions. The leads 34 and 36 are L-shaped for insertion into apertures in a printed circuit board. Another example of axial lead components having L-shaped leads is a DIP module. Since the leads 34 and 36 of the axial lead components extend laterally from the body 32, some hold-down device must be used during cutting and clinching contacting the leads 34, 36 and the body 32. Such a machine is disclosed in the aforementioned copending application.

Figure 1:
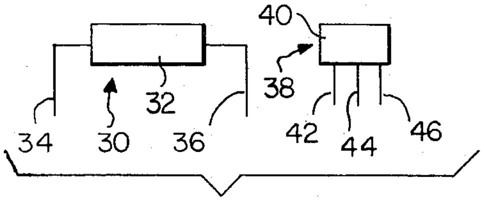
FIG. 1 is a side view of representative electrical components.

The non-axial lead component, which is represented by transistor 38 in FIG. 1, has a body 40 and a plurality of leads 42, 44 and 46, extending generally perpendicularly from only one side of the body 40. Another example of the second type of components is a single in-line resistor. Since the leads 42, 44 and 46 extend perpendicular from the body 40, the operator may prevent the leads from raising during cutting and clinching by holding the body 40 secure to the circuit board. Thus, a hold-down assembly need not be used.

It should be noted that the aforementioned copending application having a hold-down assembly may be used for any component, whereas the present invention may only process components whose leads extend generally perpendicular to the side of the body from which they emerge.

Figures 2, 5, 16:
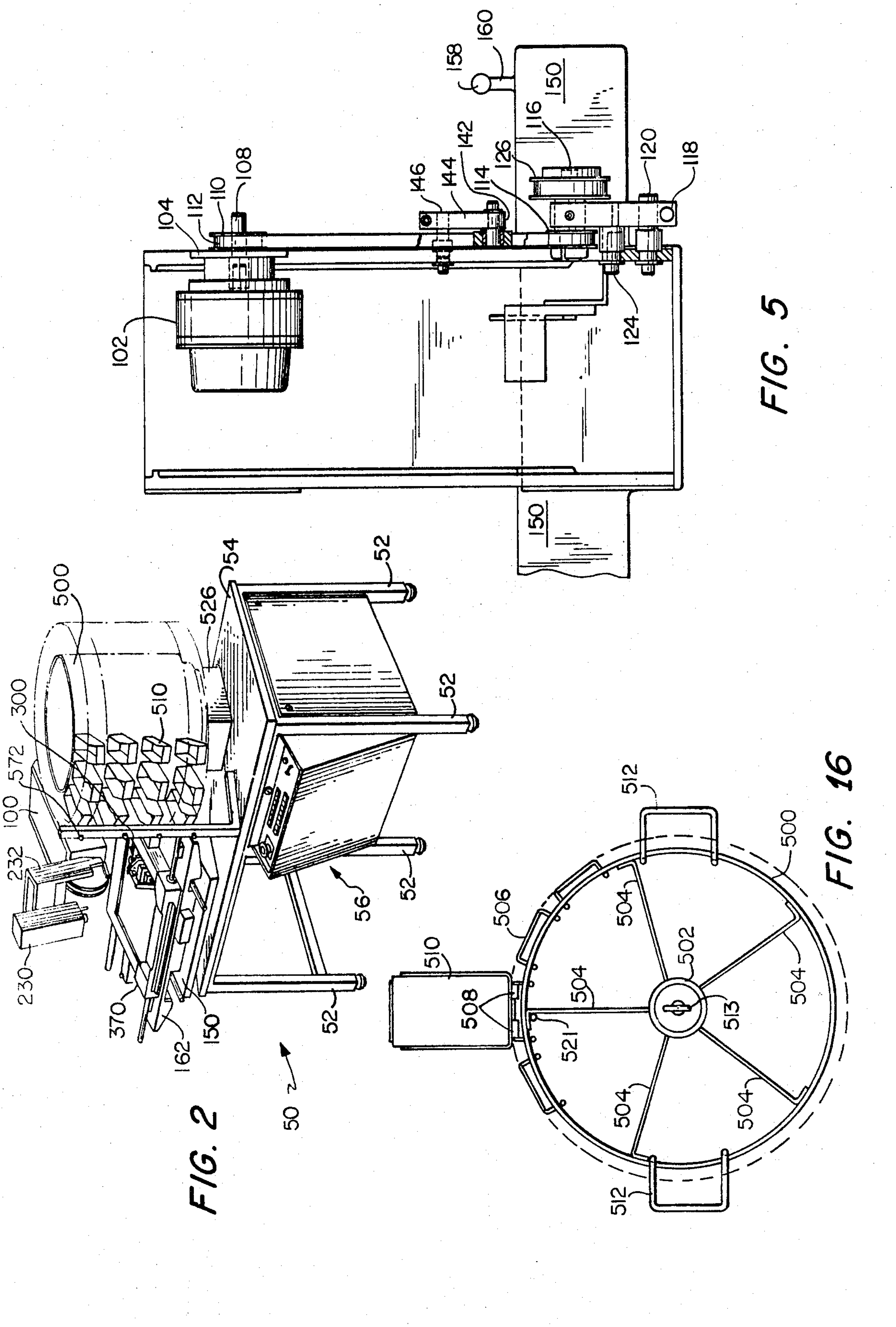
FIG. 2 is a perspective view of a preferred embodiment of the present invention.
FIG. 5 is a rear view of the cut and clinch adjustment drive assembly taken along lines 5—5 of FIG. 3.
FIG. 16 is a top view of the component carousel.

As illustrated in FIG. 2, the semi-automatic electronic component assembler of the present invention comprises console 50 having legs 52 and table top 54. On the right side of the console is illustrated graphically the control panel 56 which includes electronic and pneumatic controls and, in a preferred embodiment, a mini-computer. Secured to the table top 54 is support frame 100 which supports a projector unit 230. Directly under the projection unit 230 is the X–Y positioning system including a positioning support 350 having the X carriage 362 and Y carriage 370 mounted for orthogonal movement thereon. Below the X and Y positioning system is the cut and clinch assembly 300. To the right of the projection, positioning and cut and clinch assemblies, is a tiered carousel 500 having part bins 510 thereon. The carousel tiers 500 rest upon bin drive housing 526. Indicators 572 are also mounted to table top 54.

The operation of the present device starts with the positioning of the workpiece below theeprojector 230. The carousel tiers 500 and bins 510 thereon are rotated to position one column of bins 510 opposite indicators 572. One of the indicators 572 is activated opposite bin 510 to show which bin the next electrical component to be manually inserted is to be taken from. The operator removes the electrical component and inserts it into the workpiece in the position and orientation indicated by projector 230. The operator holds the component secure to the workpiece during the cut and clinch operation. The cut and clinch assembly, which has been rotatably adjusted for the component orientation is raised to engage the leads extending through the workpiece and cuts and clinches them. Upon completion of the cutting and clinching, the cut and clinch assembly is lowered and the X–Y table is moved to the next position, starting the cycle over again.

The assembly as just discussed will be explained in detail hereinafter:

SUPPORT FRAME

Figures 3, 6:
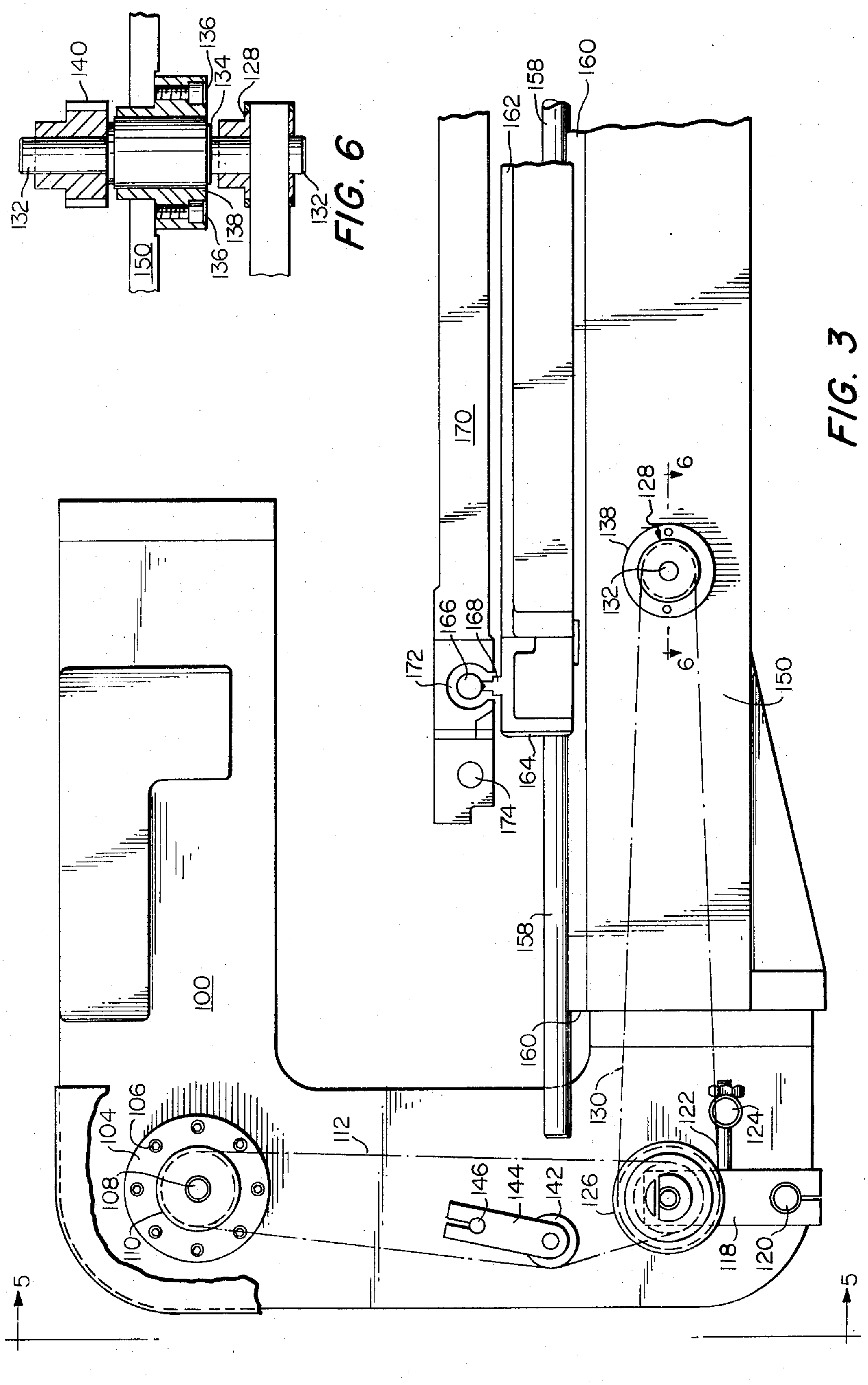
FIG. 3 is a left side view of the support frames and assemblies secured thereto.
FIG. 6 is a sectional view taken along lines 6—6 of FIG. 3.

The support frame 100 provides a mounting surface for a work lamp (not shown) and indicator projector. A motor 102 at the rear of support frame drives a series of geared belts and geared pulleys and is used to adjust the angular orientation of the cut and clinch assembly. As shown in FIGS. 5 and 6, the motor 102 is secured to the support frame by a bracket 104 and fasteners 106. A drive shaft 108 extends through the support frame 100 and has a pulley 110 secured thereon. A belt 112 connects pulley 110 and a pulley 114 secured to a shaft 116. A bracket 118 is adjustably mounted to a post 120 which is secured to support frame 100. An adjustable pin 122 is mounted to the support frame 100 by a post 124 and abuts the side of bracket 118 to prevent movement of the bracket after adjustment thereof.

Also mounted to shaft 116, on the other side of bracket 118, is a pulley 216 which is connected to a pulley 128 by a belt 130. The setting of pin 122 adjusts the tension on belt 130. The pulley 128, as shown in detail in FIG. 21, is secured to a shaft 132 which is supported by a sleeve bearing 124 journalled in and secured to the X–Y positioning support 350 by fasteners 136 and bracket 138. On the other end of shaft 132 is a gear 140 which drives a belt (not shown). The belt connects shaft 132 and the adjustment mechanism of the cut and clinch assembly (to be described in detail later). A tension roller 142 and a bracket 144 are adjustably mounted to the support frame 100 by a post 146 to maintain proper tension on belt 112.

X–Y POSITIONING SYSTEM

The X–Y positioning system moves the workpiece or circuit board so that the holes into which the next electrical component is to be inserted are approximately centered on the support frame 100, the projector mounted thereon, and the cut and clinch assembly. One of a plurality of indicators are directed from the projector and focused on the workpiece to indicate the location and orientation in which the component is to be inserted. The X–Y positioning system consists of two interacting tables, drive motors, precision lead screws, position encoders and a work holder.

As illustrated in FIGS. 2 and 3, an X–Y positioning support 150, which is generally wedge-shaped, is mounted to the console table top 54. Surface 152 is inclined from the horizontal by approximately 10°. The slight incline has been found to increase the accessability of the workpiece to the operator for the manual insertion of components. Mounted to rear surface 154 of support 150 by fastener 156 is support frame 100.

A pair of rods 158 are secured to support 150 on rails 160. The Y axis carriage 162 moves along the rods 158 on bushings 164. Similarly, the Y carriage has a pair of rods 166 secured thereto on rails 168. The X axis carriage 170 moves along the rods 166 on bushings 172. A threaded aperture 172 for the X axis 370's lead screw (not shown) is shown in FIG. 3. Secured to the X carriage 170 is a standard work holder (not shown)

to mount the workpiece on the X–Y positioning system.

The X and Y carriages are driven by printed circuit motors through a precision lead screw. Constant position monitoring is accomplished by photosensitive rotary encoders. The drive motors are controlled by a servo-system as disclosed in Pat. No. 3,739,158, which is assigned to the same assignee as the present patent and is incorporated herein by reference.

PROJECTOR UNIT

Figure 9:
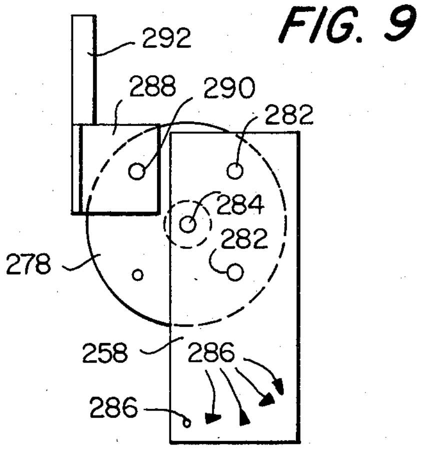
FIG. 9 is a top view of the hub and template taken along lines 9—9 of FIG. 8.
Figures 7, 8:
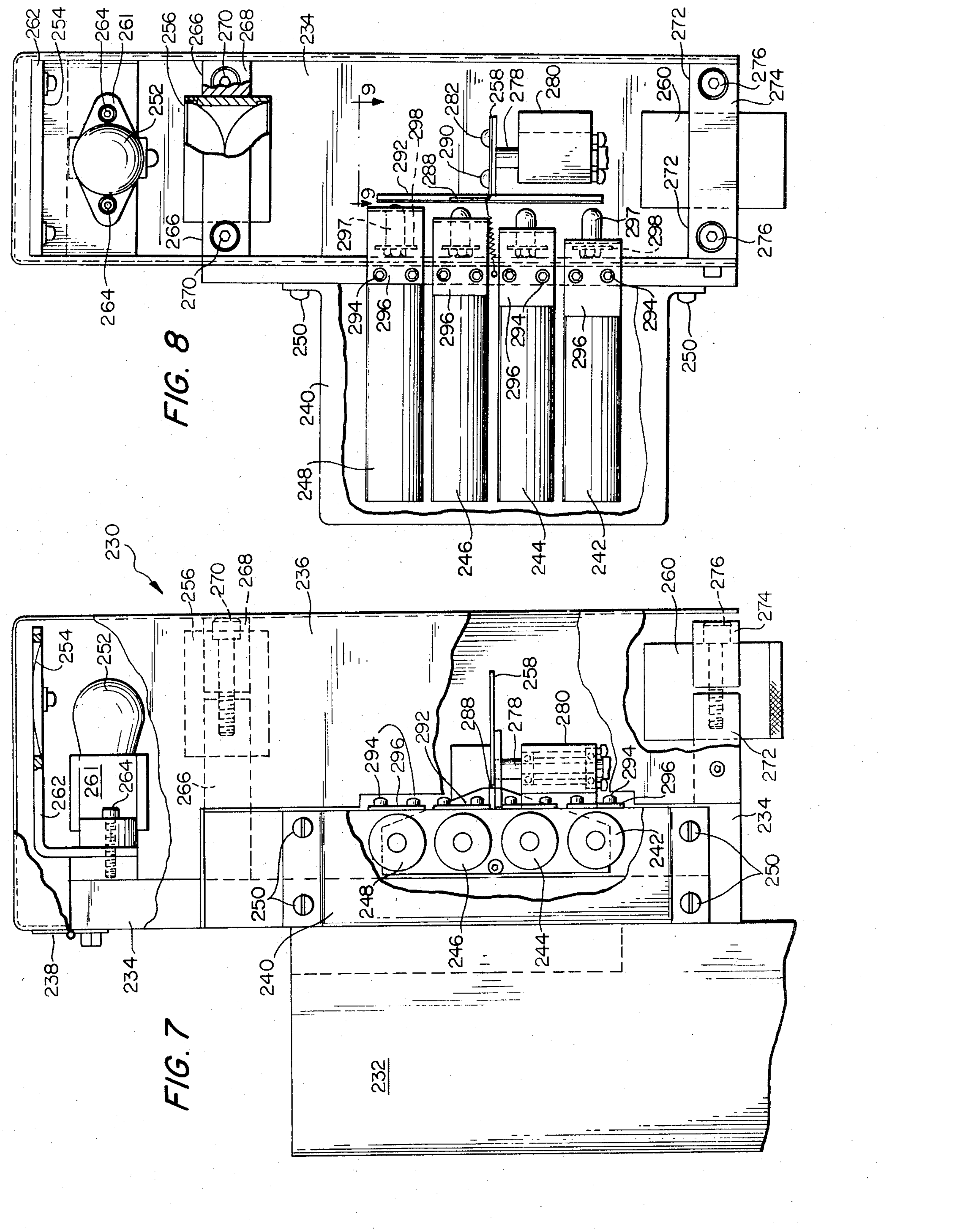
FIG. 7 is a left side view of a projection unit.
FIG. 8 is a front view of the projection unit with the front cover removed.
Figure 10:
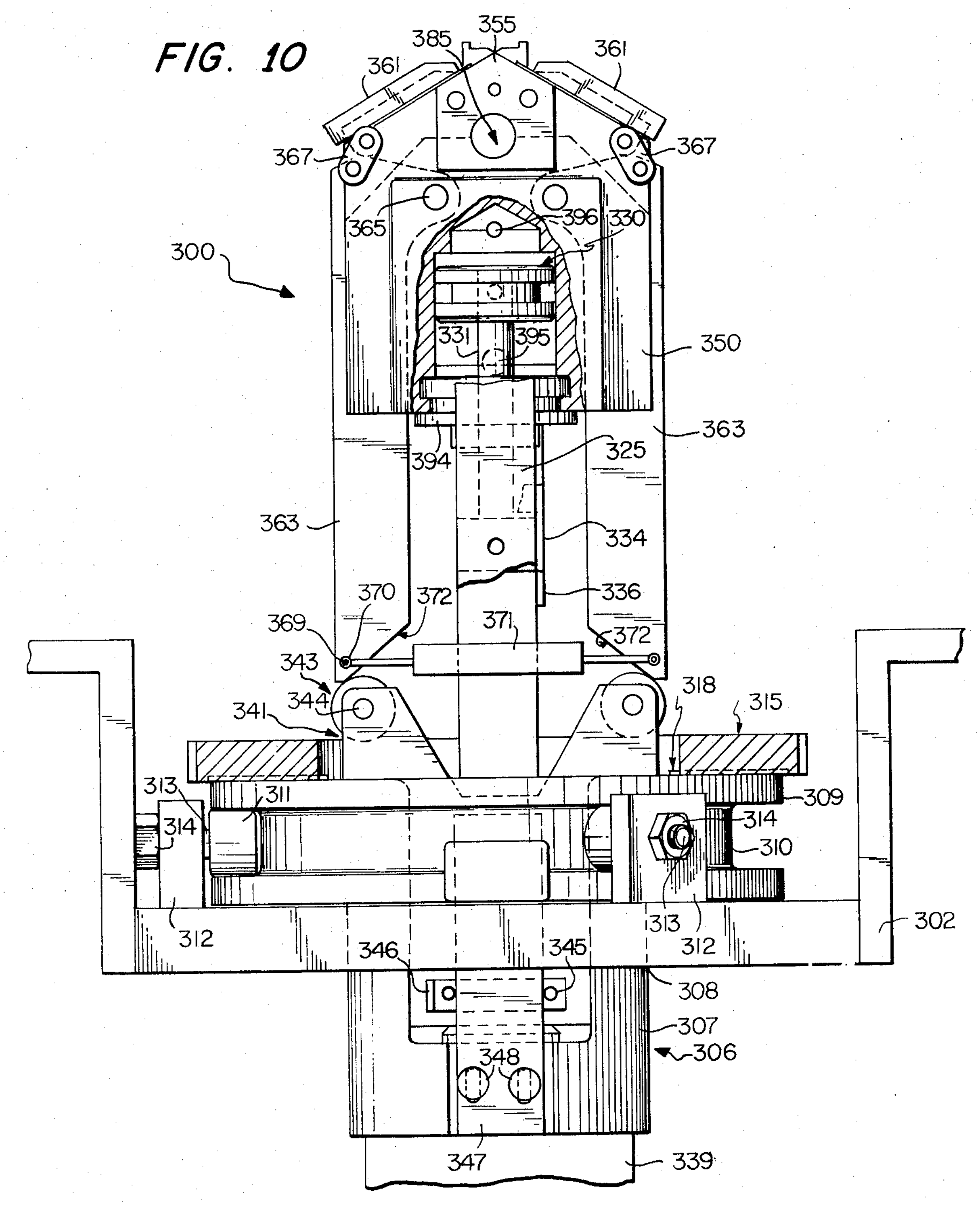
FIG. 10 is a front view of the cut and clinch mechanisms with sections cut away.
Figure 11:
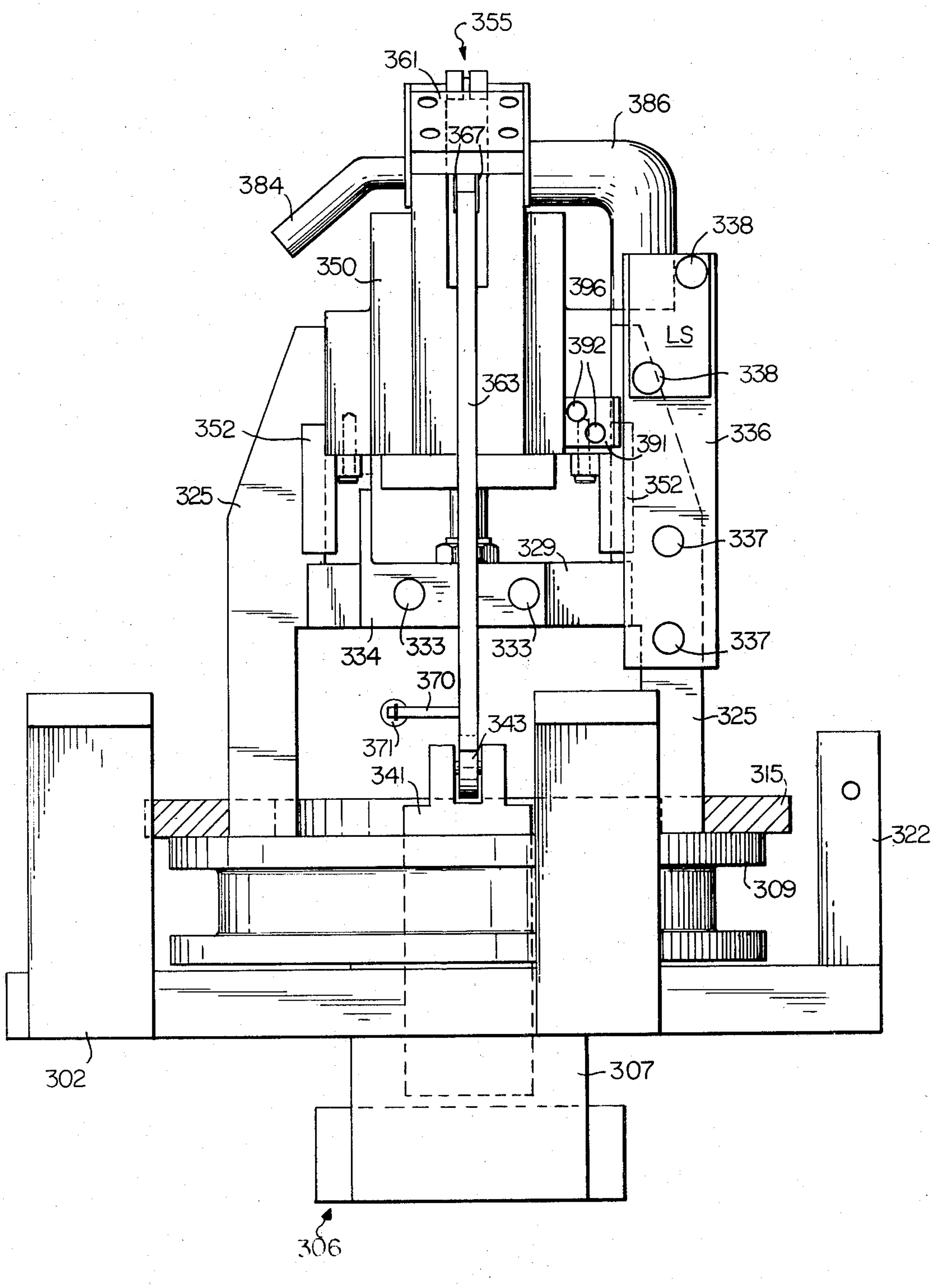
FIG. 11 is a right side view of the cut and clinch assembly.

The projector unit 230 is shown in detail in FIGS. 7–9. It is mounted to an extension 232 of support frame 100 by a support 234. A housing cover 236 for the projector is pivotally mounted on a support 234 by hinge 238 and a housing 240 for the actuator 242, 244, 246 and 248 is fastened to support 234 by fasteners 250.

The optical system of the projector unit includes a light source or lamp 252, a reflector 254, a lens 256, a template 258 and a lens 260. The lamp 252 is received in a socket 261 which is mounted with reflector bracket 262 to support 234 by fasteners 264. Lens 256 is mounted to support 234 by a pair of brackets 266, a cross brace 268 and fasteners 270. Lens 260 is held by brackets 272, cross brace 274 and fasteners 276 which are mounted to support 234. The light from source 252 is reflected from a reflector 254 and transmitted directly from source 252 to lens 256 which focuses the light at template 268. The light is transmitted through one of the selected apertures in template 258 to lens 260 which magnifies and focuses the transmitted light onto the workpiece.

The subassembly for selecting the appropriate aperture on template 258 includes a hub 278 rotatably received in bracket 280 which is mounted to support 234. The template 258, as shown in FIG. 9, is mounted to hub 278 by fastener 282 and aligned by pin 284 extending up from the center of hub 278. Five apertures 286 (a circle and four arrowheads point in directions 90° apart) are formed in template 258 and lie on an arc having its center at pin 284 which is the center of the hub and the axis of rotation. Also mounted to hub 278 by an L-bracket 288 and fastener 290 is an arm 292 which is positioned adjacent the actuators 242, 244, 246 and 248.

Mounted to support 234 by fasteners 294 are four L-shaped stops 296, one for each actuator. Extending from each actuator through stops 296 is a finger 297. A ring 298 is attached to each finger 297 and cooperates with stops 296 to limit the displacement of fingers 297. The stops are mounted such that the displacement of the fingers increase with the finger of actuator 242 having the smallest displacement, and the finger of actuator 248 having the largest displacement. The actuators are internally spring biased to return to a zero displacement when deactivated. The actuators are pneumatic but solenoids may also be used.

When one of the actuators (242, 244, 246 or 248) is activated, its finger 297 is extended to come in contact with and move arm 292. The movement of arm 292 produces a rotation of hub 278. This rotation places one of the apertures 286 on the optical axis of lens 256. The image of the selected aperture 286 is projected through lens 260 onto the workpiece. The hub is spring biased (not shown) so as to return to a home or starting position. Each actuator will position template 258 to display one of the arrowheads 286. The circle 286 is displayed when none of the actuators are activated.

The indicia projected onto the workpiece locates only one of the apertures (preferably the center aperture) and the orientation into which the electrical component is to be manually inserted. The circle 286 could indicate that the electrical component may be inserted with any orientation between the indicia aperture and the aperture to the left and the right. The arrowheads 286 could indicate the polarity or orientation that the component should be inserted or the arrowheads may correspond in direction to a particular marking on the electrical component to indicate insertion orientation. Though four actuators are shown corresponding to the four cut and clinch positions, obviously any number may be used depending upon the number of insertion positions desired.

CUT AND CLINCH ASSEMBLY

The cut and clinch subassembly is illustrated in FIGS. 10–15 and designated generally as 300. It is centered on the projector assembly beneath the circuit board. This assembly cuts and clinches the manually inserted and held-down component.

The cut and clinch assembly 300 is connected to the general assembly structure by support 302 and appropriate fasteners through apertures 304. A rotary platform 306 has a neck portion 307 which extends through aperture 308 and support 302. The upper portion or rotary platform 306 is a disc 309 having an internal channel 310 in which three cam followers 311 ride. The cam followers 311 are supported by blocks 312 which are secured to support 302 and pins 313 and nuts 314. On the top surface of disc 309 is secured a worm gear 315. The worm gear 315 is secured to the rotary platform by fasteners through apertures 316 and 317, respectively and include spaces 318.

Figure 12:
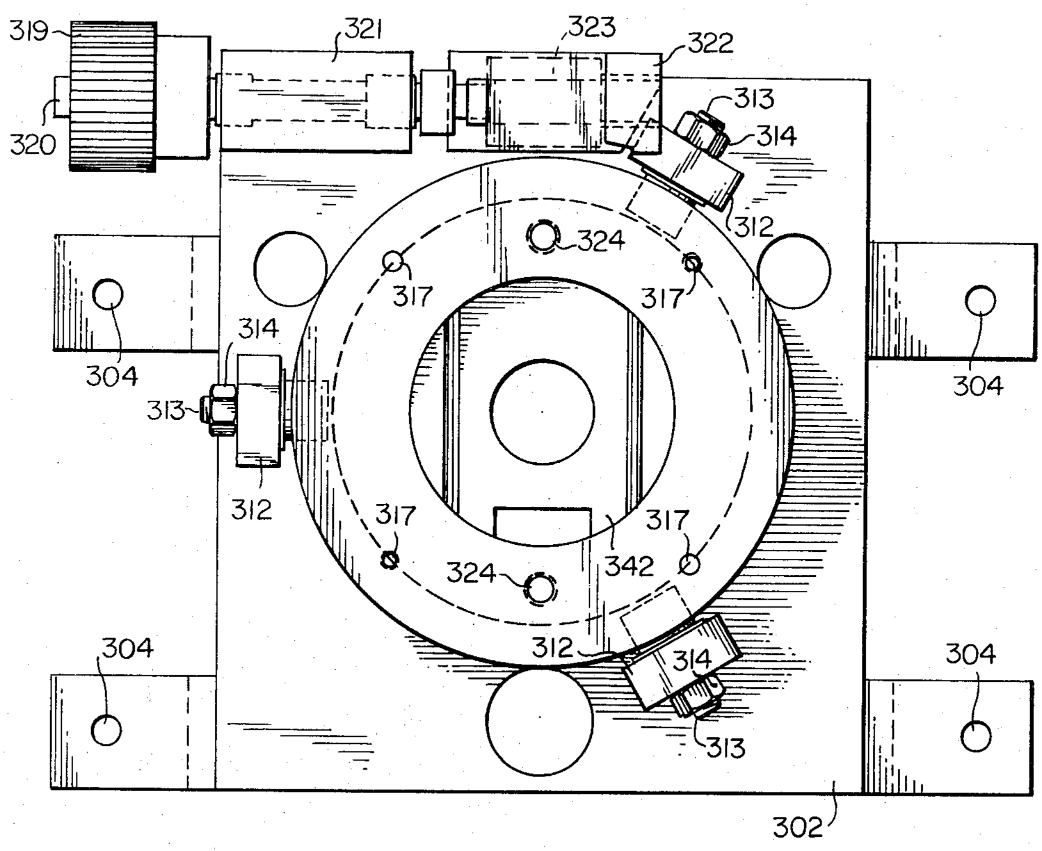
FIG. 12 is a top view of the cut and clinch assembly's support and adjustment drive.

The output of gear 140 as shown in FIG. 6 is transmitted to gear 319 by a belt (not shown). The gear 319, as shown in detail in FIG. 12, is secured to drive shaft 320 which is supported in sleeve bushings and supports 321 and 322 which are secured to the support 302. Mounted to the drive shaft 320 between supports 321 and 322 is a drive gear 323 which interacts with worm gear 315. The angular position of the cut and clinch assembly is controlled by motor 102 as transmitted through gear 319, gear 323 and gear 315. The rotary platform is suspended above the support 302 by the cam followers 311.

Figure 13:
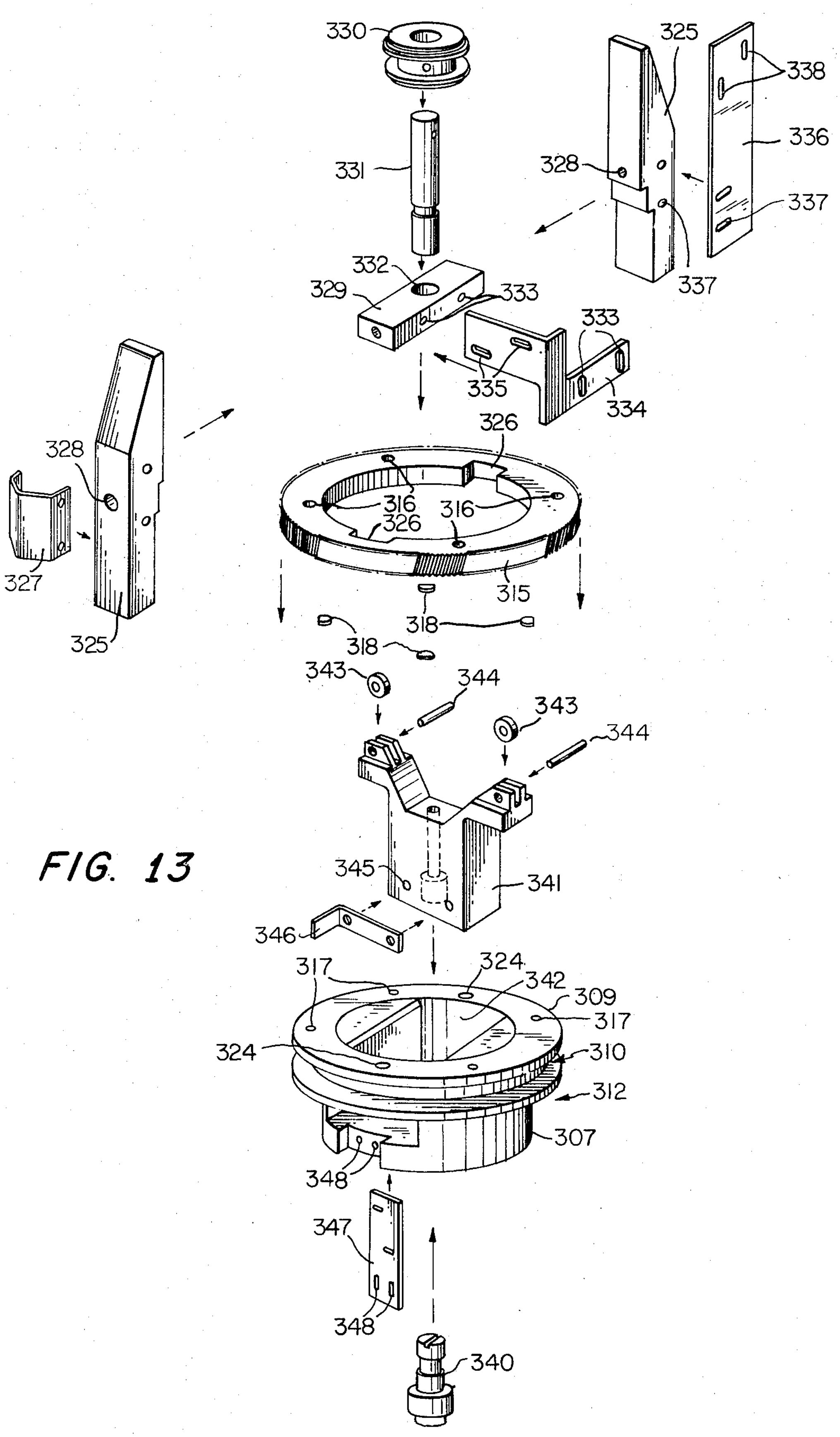
FIG. 13 is an exploded view of the cut and clinch rotary platform and associated structure.

Secured to disc 309 by fasteners through apertures 324 are two guides 325. The guides 325 rest in two slots 326 in worm gear 315. It should be noted that all of the fasteners have been intentionally omitted from FIGS. 10–15 to avoid confusion and cluttering of the various views. As shown in FIG. 13, secured to one of the guides 325 is a bracket 327. This bracket was used in combination with a plurality of sensors or limit switches, none of which are shown, that sense the angular position of the rotary cut and clinch mechanism. For the preferred embodiment described herein, four microswitches are used to sense the four positions (i.e., 0, 90, 180 and 270) of the cut and clinch mechanism to correspond withe the four arrowhead images projected by the projection unit. Though four microswitches and positions are contemplated, other systems may be used to sense the position of the rotary cut and clinch assembly for more or less positions. As with the fasteners, the microswitches are deleted from the present views to avoid confusion. However, they are understood to be secured by appropriate brackets to the stationary support 302. Secured between the two guides 325 by fasteners through apertures 328 is a connecting block 329. Connecting block 329 supports piston 330 by receiving piston rod 331 in aperture 332. As will be explained later, piston 330 is received within the anvil housing and is part of the vertical movement system to raise and lower the anvil assembly. Also secured to connecting block 329 by a fastener through apertures 333 is a sensor bracket 334. Apertures 335 receive the fasteners of the limit switch (not shown) which senses the position of the anvil assembly, as will be explained later. Similarly, a switch plate 336 is mounted to one of the guides 325 by fasteners through apertures 337. A limit switch is mounted to switch plate 336 through apertures 338.

Secured within neck portion 307 of rotary platform 306 is an air cylinder 339 having a rod 340. The rod 340 is connected to and received in the aperture in the bottom of block 341. The T-shaped drive block 341 rests in an approximately rectangular aperture 342 of the rotary platform 306 to rotate therewith. When the two upper extremities of the T-shaped drive block 341 are two rollers 343 secured thereto by pins 344. Secured to drive block 341 by fasteners through apertures 345 is an L-shaped bracket 346 which interacts with a limit switch secured to plate 347. Plate 347 is secured by fasteners through apertures 348 to the neck portion 307 of rotary platform 306. As will be explained in more detail later, the T-shaped drive block 341 causes the anvil assembly to cut and clinch the electronic component leads when piston 339 raises the block. The position of the block is sensed by the limit switch mounted to plate 347.

Figure 14:
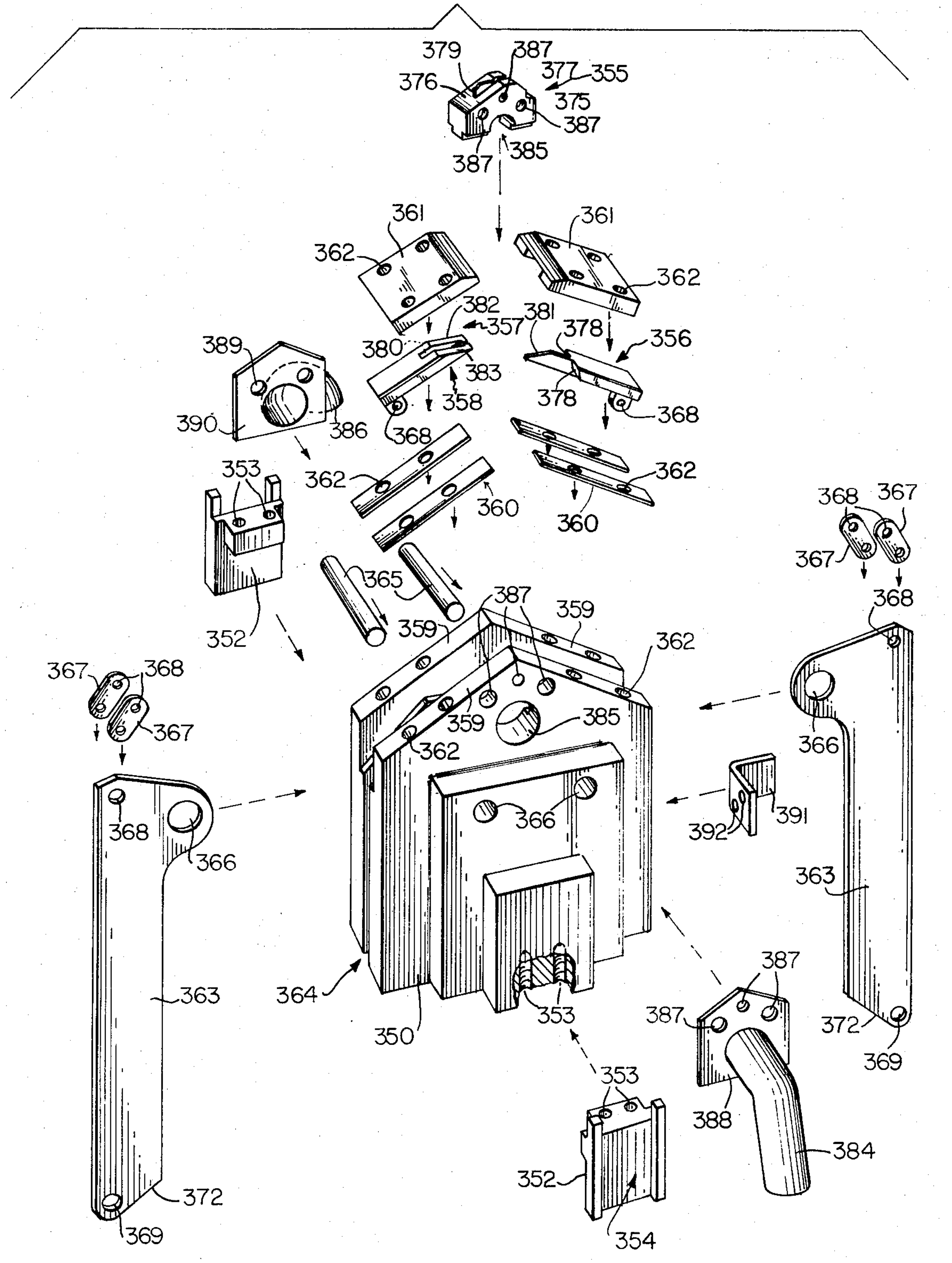
FIG. 14 is an exploded view of the cut and clinch housing and associated structure.

The anvil assembly, as shown in detail in FIG. 14, comprises generally a housing 350 having the guides 352 secured thereto by fasteners through apertures 353. Channels 354 of guides 352 receive guides 325 of the rotary platform. Secured to the apex of housing 350 is an anvil 355 which receives, in the present embodiment, three cutters and clinchers 356, 357 and 358. The cutter and clincher 356 is interlaced or rides between commonly joined cutter and clincers 357 and 358. The cutters and clinchers move along surface 359 of the housing 350 on top of wear plates 360 and under covers 361. Fasteners through apertures 362 in surface 359, wear plates 360 and covers 361 secure these members to the housing 350. A pair of arms 363, which are received within slot 364 of housing 355, rotate around pins 365 which is received within apertures 366 in the arm 363 and the housing 350. The pair of arms 363 are connected to the cutter and clinchers 356 and the pair 357, 358 by a pair of links 367 and pins (not shown) through apertures 368. At the other end of arms 363 are apertures 369 which receive post 370, between which is connected a spring 371. The spring 371 pulls the lower ends of arms 363 together and attempts to maintain the cutters and clinchers in their retracted home position. The lower ends of arms 363 are inclined or bevelled at surface 372. This surface interacts with rollers 343 of the drive block 341 to convert the vertical upward movement of the drive block 341 to horizontal movement of the lower end of the arm 363 to cause it to rotate around pins 365 so as to cause the cutters and clinchers to move towards each other and cut and clinch the leads of the electronic components in combination with anvil 355 (to be explained more fully hereinafter).

Figure 15:
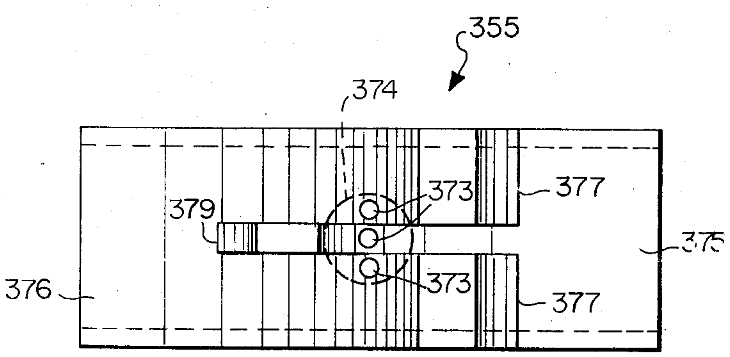
FIG. 15 is a top view of the anvil.

The anvil assembly 355, which is shown in detail in FIG. 15, has three apertures 373 lying in a single plane to receive leads 42, 44 and 46 of electronic device 38 shown in FIG. 1. The bottom of apertures 373 open into a chute 374 which connects to a system for removing the cut lead portions. The anvil 355 has two inclined surfaces 375 and 376 upon which ride cutter and clincher 356 and the pair 357 and 358, respectively. A pair of approximately vertical abutments 377 extend up from the surface 375 to act as stops in combination with a pair of surfaces 378 on cutter and clincher 356. Similarly, a single abutment 379 extends substantially vertical from surface 376 to act as a stop with surface 380 located between the pair of cutters and clinchers 357 and 358. Briefly, the leads of the electronic component extend through apertures 373 and are sheared by the lateral movement of cutters and clinchers 356, 357 and 358 past the apertures which are finally brought to rest by abutments 377 and 379. The leads are sheared as the cutters and clinchers past apertures 373 and are clinched by the bevelled or inclined surfaces 381, 382 and 383 of the cutters and clinchers 356, 357 and 358, respectively.

Returning to FIG. 14, the scraps of the leads which fall through apertures 373 and chute 374 are removed by a stream of air entering through tube 384 which communicates with passage 385 and exit tube 386. Chute 374 also communicates with passage 385. Tube 384 is mounted to housing 350 by fasteners through apertures 387 in a plate 388, housing 350 and anvil 355. Similarly, exit tube 386 is connected to the housing 350 by fasteners through apertures 389 in plate 390. Also mounted to the side of housing 350 is an L-shaped bracket 391 being secured thereto by fasteners through apertures 392. The bracket 391 cooperates with the limit switch connected to plate 336 mounted to guide 325 to indicate the position of housing 350 relative to the guide 325 and the support 302.

It is desirable to raise and lower the anvil assembly during the operation of the machine. Specifically, the anvil assembly must be lowered during the motion of the X–Y assembly to prevent the interference with the circuit board during such motion. Thus, a system is provided to produce vertical movement of the anvil assembly relative to support 302. As specifically shown in FIG. 10, the piston 330 is received within a bore 393 in housing 350. The bore 393 is sealed by a gasket 394 through which connecting rod 331 of piston 330 travels. Bore 393 has two ports 395 and 396 located in the bottom and top thereof for the admittance of a fluid under pressure to control positioning of the housing 350 relative to the piston 330. since the piston 330 is secured to the vertically stationary rotary platform 306 by guides 325 and connecting block 329, when fluid under pressure is introduced through port 396, the housing 350 and consequently the anvil assembly is raised relative to the support 302. Once the cut and clinch mechanisms have been activated to cut and clinch the leads of the electronic components, fluid under pressure is introduced into port 395 to force the housing 350 downward relative to the stationary piston 330 and to force the liquid above the piston 330 to exit through port 396. Thus, the anvil assembly is in this lowered position to permit the repositioning of the circuit board by the X–Y system.

The operation of the cut and clinch assembly begins with the angular positioning of the assembly via drive gear 319, gear 323, worm gear 315 to rotate the rotary platform 306 to one of four angular positions. Once this has been accomplished under the command of the central controller and the X–Y system has positioned the circuit board in the proper position relative to a fixed point, the cut and clinch assembly is ready for activation by the operator. Once the operator has inserted the electronic component as indicated by the projection system, he presses a switch (for example, a foot switch) which commands the operation of the cut and clinch assembly. Fluid is introduced through port 396 to raise the anvil assembly, including housing 350 and arms 363. Once the anvil assembly is raised to the proper position, as sensed by a microswitch secured to plate 336, the leads of the electronic component will extend within apertures 373 of anvil 355. Pneumatic cylinder 339 is then activated to raise drive block 341 whose rollers, when intersecting with surface 372 of arms 363, cause the arms to rotate. The rotation of arms 363 forces the cutters and clinchers 356, 357 and 358 to move along surfaces 375 and 376 of anvil 355 so as to shear the leads and clinch the sheared leads secured to the circuit board. The movement of arms 363 and drive block 341 are sensed by microswitches attached to brackets 334 and 347, respectively. Once surfaces 378 and 380 come in contact with abutments 377 and 379, respectively, the cutters and clinchers are stopped. At this point, cylinder 339 is deactivated and the arms 363 rotate back to their normal condition under the urging of spring 371. Simultaneously or subsequently, fluid under pressure is introduced into port 395 to lower the anvil assembly and housing 350. Thus, the cut and clinch assembly has been returned to its initial position, awaiting re-initiating of the cycle upon manual insertion and manual hold-down of the next component.

BIN ASSEMBLY

Figure 4:
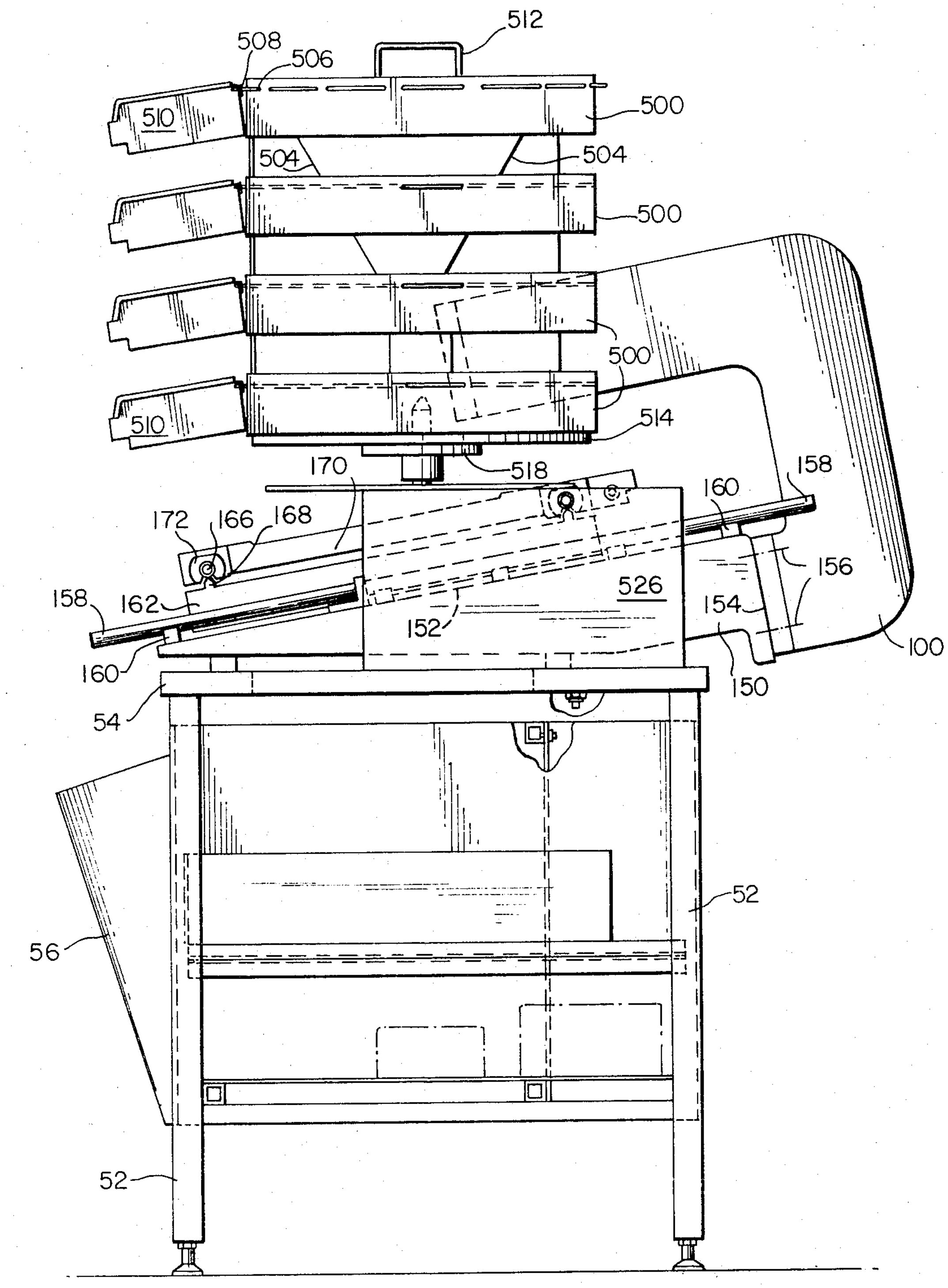
FIG. 4 is a right side view of a preferred embodiment of the present invention.
Figure 17:
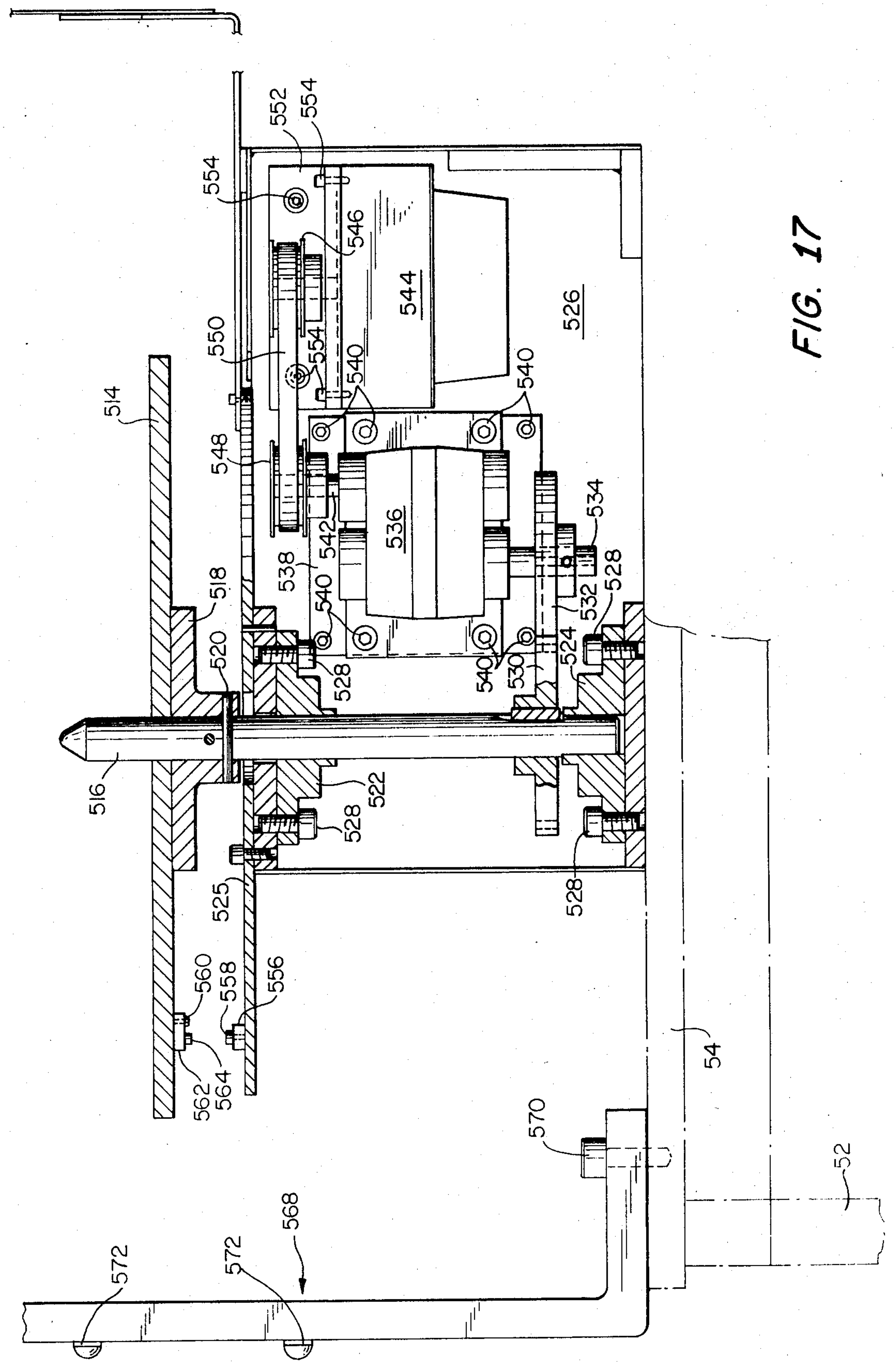
FIG. 17 is a right side view of the component bin drive assembly.

The bin assembly, as illustrated in FIGS. 4, 16 and 17, is a four-tier carousel having the individual tiers 500 secured to a center support shaft 502 by five spokes 504. Around the periphery of each tier 500 are fifteen brackets 506 which receive U-shaped hooks 508 mounted to the rear of part bins 510. The number of tiers and bins on the tiers are only examples, thus they may be varied to meet desired design requirements. The disclosed numbers provide sixty separate bins from which electrical components may be chosen for manual insertion. By using bracket 506 and hooks 508, the individual bins may be replaced with a bin supplied with the same components or different components without using any tools. Also, a handle 512 and a hook 513 are provided at the top of the carousel so that the whole carousel may be replaced with another carousel with a different arrangement of bins and components therein for a different job. It should be noted, however, that with sixty bins and the computer's knowledge of their location and contents, the machine may be programmed for most jobs without replacing the carousel or rearrangeing or replacing any of the bins 510.

The lowest tier of the carousel rests on a rotating platform 514 which is secured to a drive shaft 516 by a member 518 and pin 520. A pin 521 (shown in FIG. 16) protruding from the carousel is received in a slot (not shown) in the platform 514. The pin 521 indexes the carousel realtive to the rotating platform 514. The drive shaft 516 is journalled between two brackets 522 and 524 which are secured to the table top 54 and to the top of bin drive housing 526 by fasteners 528. Mounted to the lower end of drive shaft 516 is a gear 530 which is driven by gear 532 mounted to the output shaft 534 of transmission 536. The transmission 536 is mounted to the sides of bin drive housing 526 by bracket 538 and fasteners 540. The input shaft 542 of transmission 536 is driven by motor 544 through pulleys 546 and 548 and belt 550. The motor 544 is mounted to the side wall of the bin drive housing 526 by a bracket 552 and fasteners 554.

The top 525 of bin drive housing 526 is circular and has mounted thereto fifteen reed switches 556 by fastener 558. The reed switches are equidistant and correspond to the number of bins per tier. Secured to the bottom of platform 514 by fasteners 560 and brackets 562 is a magnet 564. A tier indicator 568 is mounted to the table top by fastener 570 and includes four lights 572 which indicate the tier a component is to be selected from.

The bin assembly is under the control of the computer which rotates the carousel by selective operations of transmission 536 until the desired bin is adjacent tier indicator 568. The computer senses the proper location when magnet 564 is adjacent the appropriate reed switch 556. Once the carousel has stopped, one of the four tier lights 572 is activated by the computer to indicate which tier and therefore in which bin the next part to be manually inserted is located.

PNEUMATIC CONTROL CIRCUIT

Figure 18:
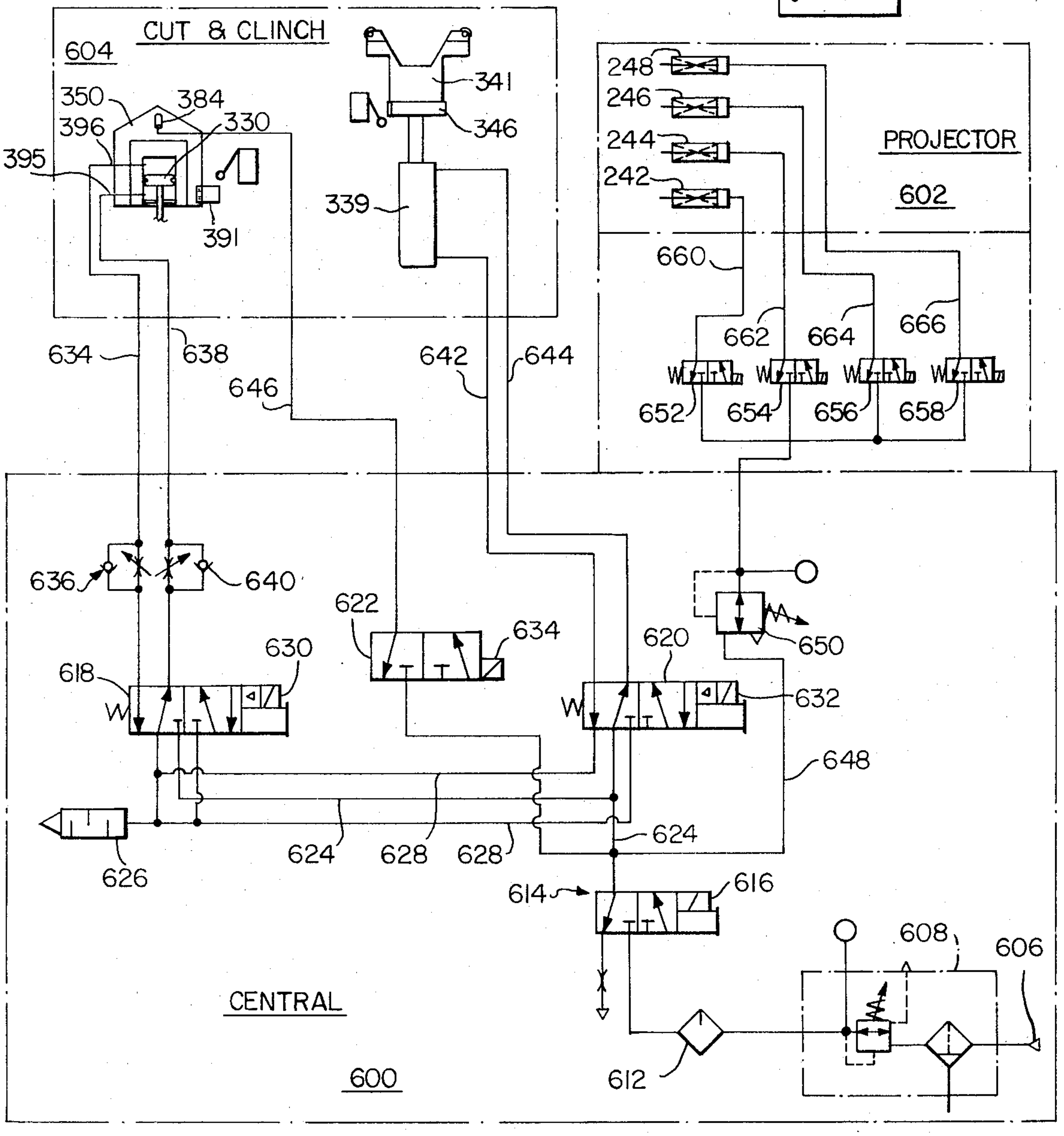
FIG. 18 is a schematic of the pneumatic circuit and controls.

The pneumatic controls, as illustrated in FIG. 18, are subdivided into three basic units in three locations, i.e., the central pneumatic control 600, the projector unit control 602, and the cut and clinch control 604.

Pressurized air is introduced into the pneumatic control section 600 at 606 and passes through a filter regulator 608 and continues through a lubricator 612 to a three-way valve 614. Solenoid 616 operates valve 614.

Two five-way valves 618, 620 and a three-way valve 622, are connected to valve 614 by line 624. A speed control muffler 626 is connected to two ports each of valves 618 and 620 via line 628. The valves 618, 620, 622 are controlled by solenoids 630, 632 and 634, respectively. Valve 618 is connected to port 396 of anvil housing 350 by lines 634 and flow control valve 636 and to port 395 by lines 638 and flow control valve 640. Valve 620 is connected to drive block cylinder 339 via lines 642, 644. Valve 622 is connected to scrap lead blow line 384 in anvil housing 350 by line 646. Cylinders of projector actuators 242, 244, 246 and 248 are connected to valve 614 via line 648, regulator 650, three-way valves 652, 654, 656, 658 and lines 660, 662, 664, 666, respectively.

ASSEMBLY MACHINE OPERATION

Assuming that the machine has been in operation, the workpiece is moved so as to center, on the support frame 100, the next three apertures in the workpiece into which the next electrical component is to be manually inserted. The operator selects a component from the appropriate bin 510 which will be adjacent to the activated indicator 572. If needed, the carousel was rotated during the X–Y positioning of the workpiece so as to provide a single column of bins 510 adjacent to the indicators 572.

The center aperture in the circuit board, into which the electrical component is to be inserted, is indicated by a circle or one of the four arrows produced by the apertures 286 and template 258. The appropriate projected image is selected by activation of one or none of the pneumatic actuators 242, 244, 246 or 248. The electrical component is manually inserted in the apertures in the workpiece with the center lead in the illuminated aperture and the component oriented as indicated by the indicia arrows projected thereon.

After the component has been manually inserted in the location with the proper orientation and manually-held secure to the workpiece, a foot switch (not shown) is depressed by the operator. Prior to this, the controller has rotated platform 306 and the cut and clinch assembly 300, using drive motor 102, to a position corresponding to the component orientation of the projected image. Once the controller senses that the cut and clinch assembly is in the proper angular position and the foot switch is depressed, the cut and clinch assembly is raised and cuts and clinches the component leads (as described above in detail). After the leads are cut and clinched, the cut and clinch assembly is lowered to allow the workpiece to be repositioned to the next position. Thus, the cycle just described is repeated, starting with the positioning and selection of components.

Though the preferred embodiment has been described for three leads in a single plane, obviously the anvil assembly could be modified to accommodate any number of leads or to accommodate three leads not in a single plane by changing the number of anvil apertures 373 and cutters and clinchers and the location of anvil aperture 373, respectively.

Thus, the present assembly machine provides automatic positioning of the workpiece, indication of location and orientation of components to be inserted, location of source of component, and cutting and clinching mechanisns for the manually inserted electrical component. The present apparatus provides the ability for cutting and clinching leads of components inserted at any angular position.

Although the invention has been described and illustrated in detail, it is to be clearly understood that the same is by way of illustration and example only and is not to be taken by way of limitation. The spirit and scope of the present invention are limited only by the terms of the appended claims.

What is claimed:

1. A device for assembling manually inserted electrical components with leads extending from a single side to a workpiece comprising:
- means for positioning said workpiece relative to a fixed point;
- means for indicating on said workpiece the location and orientation of the component to be manually inserted;
- means for indicating location of a supply of said component to be inserted;
- means rotatably mounted below said fixed point for cutting and clinching said leads of said inserted electrical component; and
- control means for activating said positioning means, both of said indicating means and said cutting and clinching means, whereby said cutting and clinching means is rotated for the orientation of said indicated component on the positioned board.

2. A device as in claim 1 wherein said means for positioning includes means for holding said workpiece and means to move said holding means in a single plane.

3. A device as in claim 1 wherein said orientation indicating means includes means for projecting at said fixed point an image indicating the location and orientation of the component to be inserted.

4. A device as in claim 1 including a plurality of supply sources' means movable relative to said supply indicating means.

5. A device as in claim 1 wherein said cutting and clinching means is rotated by said control means to an angular position corresponding to the orientation indicated by said orientation indicating means.

6. A device as in claim 5 wherein said fixed point lies on the axis of rotation of said cutting and clinching means.

7. A device for assembling manually inserted electrical components having a plurality of leads extending from a single side to a circuit board comprising:
- means for positioning said circuit board in a plane defined by said circuit board relative to a fixed point;
- means for indicating on said circuit board said fixed point and the orientation of said component to be manually inserted relative to said fixed point;
- means rotatably mounted below the plane of said circuit board at said fixed point for cutting and clinching said leads of said inserted electrical component; and
- means for controlling said positioning means, said indicating means and said cutting and clinching means.

8. A device as in claim 7 wherein said indicating means includes a light source, means for producing a plurality of images which indicate the location of said fixed point and said component orientation and means for projecting any one of said plurality of images on said circuit board at a time.

9. A device as in claim 8 wherein said image producing means includes a template with a plurality of apertures, one for each of said plurality of images, and means for positioning said template to select said one image to be projected.

10. A device as in claim 7 wherein said cutting and clinching means includes an anvil assembly, means supporting said anvil assembly for rotational and vertical movement, means for rotating said anvil assembly to a desired angular position, and means for raising said anvil assembly for cutting and clinching and lowering said anvil assembly for circuit board positioning.

11. A device as in claim 10 wherein said rotating means includes a gear driven by said control means and said raising and lowering means includes a piston.

12. A device as in claim 10 wherein said anvil assembly includes at least three cutting and clinching means and means for moving said lead cutting and clinching means relative to said anvil assembly to cut and clinch said component's leads.

13. A device as in claim 12 wherein said lead cutting and clinching means are in two groups mounted facing each other interlaced so as to clinch adjacent component leads in opposite directions.

14. A device as in claim 12 wherein said anvil assembly includes a plurality of coplanar apertures for receiving said component's leads and means below said apertures for carrying severed lead portions away from said anvil assembly.

15. An apparatus for cutting and clinching leads of electron components projecting beneath a circuit board comprising:

an anvil assembly;

means supporting said anvil assembly for rotational and vertical movement;

means for rotating said anvil assembly to a desired angular position;

means for vertical movement of said anvil assembly;

at least three cutting and clinching means mounted to said anvil assembly; and means for moving said cutting and clinching means relative to said anvil assembly to cut and clinch said component's leads.

16. An apparatus as in claim 15 wherein said cutting and clinching means are in two groups mounted facing each other interlaced so as to clinch adjacent component leads in opposite directions.

17. An apparatus as in claim 16 wherein said cutting and clinching means are linked to the other members of their group, and wherein said cut and clinch movement means includes a pair of arms pivotally mounted to said anvil assembly, each arm having one end connected to one of said groups and an actuator means for moving said arms to pivot and move said cutting and clinching means.

18. An apparatus as in claim 15 wherein said anvil assembly includes a plurality of coplanar apertures for receiving said component's leads and means below said apertures for carrying severed lead portions away from said anvil assembly.

19. An apparatus as in claim 15 wherein said support means includes a first gear to which said anvil assembly is mounted for rotational movement therewith and vertical movement relative thereto, and said rotating means includes a second gear to drive said first gear to said desired position.

20. An apparatus as in claim 19 wherein said support means includes a piston mounted to said first gear and received in a chamber in said anvil assembly and said vertical movement means includes a fluid source for moving said anvil assembly relative to said piston.

21. An apparatus as in claim 17 wherein said actuator means includes a pneumatic cylinder, a member rotatably mounted to said cylinder for rotational movement with said support means and vertical movement relative to said support means.

22. An apparatus as in claim 21 wherein said other end of said arms is bevelled so that vertical movement of said member is translated to horizontal movement of said other end of said arms.

* * * * *